United States Patent
Fukuda et al.

(10) Patent No.: US 6,365,995 B1
(45) Date of Patent: Apr. 2, 2002

(54) BRUSHLESS MOTOR AND ITS ASSEMBLY METHOD

(75) Inventors: Yoshiaki Fukuda, Akashi; Koji Kuyama, Yonago; Toshio Uehara, Yonago; Kazuhito Itakura, Yonago; Chiaki Yamamoto; Shigeru Yoshida, both of Tottori-ken; Hiroyasu Fujinaka, Kadoma; Mikio Umehara, Yonago; Noriyoshi Sato, Yokohama, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/499,617

(22) Filed: Feb. 7, 2000

Related U.S. Application Data

(63) Continuation-in-part of application No. 09/401,987, filed on Sep. 23, 1999, now abandoned.

(30) Foreign Application Priority Data

Nov. 20, 1998 (JP) .......................................... 10-330658
Dec. 25, 1998 (JP) .......................................... 10-369168
Dec. 25, 1998 (JP) .......................................... 10-369178

(51) Int. Cl.⁷ ............................................... H02K 7/06
(52) U.S. Cl. ...................... 310/81; 310/156.38; 340/7.6
(58) Field of Search .......................... 310/81, 268, 269, 310/156.38, 51, 89; 340/7.6, 7.63; 368/230

(56) References Cited

U.S. PATENT DOCUMENTS

| | | | | |
|---|---|---|---|---|
| 4,980,590 A | * | 12/1990 | Taniguchi et al. | ............ 310/81 |
| 5,007,105 A | * | 4/1991 | Kudoh et al. | ................ 455/344 |
| 5,027,025 A | * | 6/1991 | Saneshige et al. | .......... 310/156 |
| 5,057,753 A | * | 10/1991 | Leuthold et al. | ............ 318/254 |
| 5,153,473 A | * | 10/1992 | Russell | ......................... 310/81 |
| 5,175,459 A | * | 12/1992 | Danial et al. | ................. 310/81 |
| 5,471,103 A | * | 11/1995 | Fujii | ............................ 310/81 |
| 5,878,004 A | * | 3/1999 | Miyauchi et al. | ........... 368/230 |
| 5,942,833 A | * | 8/1999 | Yamaguchi | ................. 310/268 |

FOREIGN PATENT DOCUMENTS

| | | | |
|---|---|---|---|
| JP | 01091643 | * | 4/1989 |
| JP | 10248203 | * | 9/1998 |
| JP | 10262352 | * | 9/1998 |

* cited by examiner

*Primary Examiner*—Joseph Waks
(74) *Attorney, Agent, or Firm*—Parkhurst & Wendel, L.L.P.

(57) ABSTRACT

Brushless motors for portable information equipment that can be simultaneously reflow-soldered to a substrate and efficiently and densely mounted thereon in such a way that the coupled portion between the motor and the substrate has a high impact resistance, thereby providing small and reliable portable information equipment having a high productivity. The brushless motor including a housing having a bottom surface, a side surface, and a top surface, the bottom surface being located adjacent and opposite to a substrate of equipment; a plurality of lands (2a, 2e) on the bottom surface that can be mechanically or electrically joined with the substrate of the equipment; a stator (1), a bearing device (3), and a rotor (4) inside said housing, the stator (1) having a stator core (6) and a coil (7) wound around the stator core (6), the rotor (4) having a magnet (13) and being supported by the bearing device (3) so as to rotatably surround the periphery of the stator (1), the rotor (4) further including a circular weight (14).

14 Claims, 17 Drawing Sheets

102   100   101

BRUSHLESS MOTOR AND ITS ASSEMBLY METHOD

This application is a continuation-in-part of application Ser. No. 09/401,987, filed Sep. 23, 1999, now abandoned

FIELD OF THE INVENTION

The present invention relates to the structure of a small flat brushless motor and its assembly method.

BACKGROUND OF THE INVENTION

Portable information equipment (hereafter referred to as "equipment") including, for example, cellular telephones are desired to be smaller, lighter, and thinner, to give a sophisticated impression, and to endure longtime use. Equipment manufacturers are making various efforts to meet these demands. They are attempting to reduce the size and power consumption of electronic parts integrated into the equipment, to use multilayer wiring substrates to allow electronic parts to be densely integrated while increasing productivity, and to configure enclosures using light metal such as magnesium to reduce the thickness of the equipment and give it a sophisticated impression. There are similar demands on flat brushless motors used as a drive source for the equipment.

A vibration generating function for silent calls is now essential for cellular telephones. The vibration generating function is generally implemented by a vibrating motor with an eccentric weight. This is because such a motor has excellent characteristics such as a small size, a low power consumption, and a low price and is thus advantageous in reducing the weight of the equipment. The vibrating motor must also serve to improve the value of the equipment.

Requirements on vibrating motors and flat brushless motors used as equipment drive sources (hereafter, these motors may be collectively and simply referred to as "brushless motor" or "motors") that should to be met to improve the value of the equipment will be considered. First, brushless motors must be adapted for the improved degree of integration of the equipment. Thus, as in other solid electronic parts, the brushless motor can desirably be mounted on a substrate of the equipment using "surface mount technology." This is because in case of a multilayer substrate, the degree of integration may decrease if terminals are passed through holes formed in the substrate. In order to improve the degree of integration, the brushless motor is desirably configured by being mounted close to adjacent electronic parts so as to achieve a high density.

Second, the brushless motor must be adapted for the same mounting process as other solid electronic parts in order to increase the productivity of the equipment. Thus, the brushless motor desirably has a configuration and a heat resistance compatible with a reflow soldering method. It is also desirably configured by being efficiently mounted using the same assembly machine as other solid electronic parts.

Third, the brushless motor must be adapted for the reduced size and weight of the enclosure of the equipment. Thus, it desirably has a high impact resistance.

The reasons for the demand for the high impact resistance will be described. Of course, the high impact resistance is required to ensure that the equipment will not be destroyed even if it is inadvertently dropped. Conventional common methods provide a certain amount of space inside the equipment and integrate the motor into the equipment via an elastic body. In recent years, however, the demand for reduced size and thickness prevents a space for the elastic body from being provided. If an attempt is made to surface-mount the motor on the same substrate as other electronic parts in order to meet the demand, the brushless motor is directly fixed to the substrate, thereby preventing impacts to be absorbed as in elastic support structures.

Furthermore, attempts are being made to form the enclosure of the equipment of light metal such as magnesium or aluminum, as described above. Despite its small weight, such metal has a much higher rigidity than resin so its buffering capability is insufficient. Consequently, an unprecedentedly large impact is effected on the substrate fixed to the enclosure and is directly transmitted to the motor fixed to the substrate. As a result, a very high impact resistance is required of the motor and its coupling. Therefore, the desired value of motor impact resistance is conventionally between 3,000 and 5,000 G but now between 10,000 and 20,000 G.

Besides, this impact resistance is desirably met by simply heating and melting a solder on the substrate to solder-connect the motor to the substrate (reflow) without passing terminals through holes formed in the substrate (surface mount). Even enduring a reflow heating temperature (about 250° C.) is difficult. The inventor attempted to find a conventional technique that meets these requirements, but in vain. Thus, through many examinations, the inventor has completed the present invention. A motor according to the present invention is of a flat type having a height smaller than the breadth, so it is sometimes referred to as a "flat vibrating motor" or a "flat brushless motor."

Next, brushless motors will be described by focusing on conventional assembly methods.

A small flat brushless motor generally comprises a metal base on which various parts are assembled. Since the motor is a rotational power source for the equipment, it must be mounted in the equipment so as to maintain a sufficient rigidity and the metal base must be formed accurately so as to be suitable as a criterion for motor assembly. To assemble the motor, the base is placed on a palette (a positioning working table) and the parts are then mounted on the base.

According to this assembly method, before placing the base on the palette, whether or not the base is located upside down is checked and its direction and position are adjusted. The time required for this operation, however, tends to increase with decreasing size of the motor. This is because it is more difficult to handle smaller parts.

This tendency is found not only in the positioning of the motor base but also in the assembly of electronic parts on a printed circuit board. The electronic parts are difficult to efficiently mount on a small printed circuit board.

In addition to the reduced size, there is a strong demand for the reduced weight of the motor for portable equipment. However, in attempting to reduce the size and weight of the motor, the characteristics of the motor must not be sacrificed. Thus, a rotor and a stator must naturally have a specified size and weight. Accordingly, it is now necessary to reduce the volume and weight of peripheral members including structures other than the rotor and stator, that is, a structure for holding the rotor and stator and a structure for electrically connecting the stator and external device together.

The printed circuit board assembly method called the "connected substrate" is conventionally commonly used to produce built-in circuits for various equipment. When printed circuit boards have small or different external shapes, this method arranges a large number of such circuit boards and connects them together using bridges or frames so as to form a shape that is easily handled by an electronic parts mounting machine. After electronic parts have been mounted on these circuit boards, the bridges are cut and removed to obtain printed circuit board assemblies in order to complete assembly.

This method, however, is still disadvantageous if further size reduction is required. In addition, as the size of the printed circuit board decreases, the area occupied by the bridges or frames relatively increases to reduce the usage of material resources. In addition, despite a demand for further reduction of the size of the printed circuit board, when a shearing machine is used to cut the bridges, contacts with the cutting edge and stress caused by shearing must be avoided. As a result, no part can be placed near the sheared position. The bridges may be folded or ruptured, but the separated portion form a rough rupture surface to degrade the appearance and dimensional accuracy. Due to these disadvantages, this method is unsuitable for small parts. Furthermore, since the separation is carried out after the completion of assembly, an impact associated with shearing may degrade the quality of finished products.

Thus, an assembly method is desired that solves these problems in configuring a compact motor by mounting parts on a printed circuit board densely.

In attempting to meet these demands, another object is to reduce the volume and weight of the members such as the structure for holding the rotor and stator and the structure for electrically connecting the stator and external device together.

OBJECTS OF THE INVENTION

A first object of the present invention is to meet the above requirements, that is, to contribute to improving the degree of integration of the equipment. Thus, the motor must be configured by being mounted on the substrate of the equipment using the SMT technology and to be mounted close to adjacent electronic parts so as to achieve a high density.

A second object is to contribute to improving the productivity of the equipment. Thus, the motor must have a configuration and a heat resistance compatible to the reflow soldering method and must be configured by being efficiently mounted using the same assembly machine.

A third object is to contribute to reducing the size and weight of the equipment. Thus, the motor must have a sufficient impact resistance.

A fourth object is to improve the assembly productivity. Thus, the present invention must provide a structure that is easier to handle and assemble and an assembly method for such a structure.

A total object of the present invention is to attain the above objects to provide portable information equipment having a reduced size and weight, an increased productivity, and high added values.

DISCLOSURE OF THE INVENTION

In order to attain these objects, a brushless motor according to the present invention comprises a housing comprising a bottom surface, a side surface, and a top surface, the bottom surface being located adjacent and opposite to a substrate of an equipment; pairs of terminals on the bottom surface that can be mechanically or electrically joined with the substrate of the equipment; a stator, a bearing device, and a rotor inside the housing, the stator having a stator core and a coil wound around it, the rotor having a magnet and supported by the bearing device so as to rotatably surround the periphery of the stator, the rotor further including unbalance means or housing drive means that protrudes from part of the housing and that rotates with the rotor.

In addition, in order to solve the problems with the assembly of the brushless motor, a motor assembly method according to the present invention uses a motor base connector. The motor base connector comprises motor bases each using a plate-like material as a base material and comprises a plurality of motor bases and a skeleton that remains after these motor bases have been punched out, the plurality of motor bases being pushed back and held in the skeleton. Each motor base is completed by executing the steps of fixing the bearing device and the stator to a stator mounting surface, assembling the rotor on the bearing device, and removing the motor from the skeleton.

Next, the structure of the brushless motor and its assembly method according to the present invention are described in detail.

First, a flat brushless motor according to a first aspect of the present invention is adapted to meet the following requirements:

(a) The motor has a housing comprising a bottom surface, a side surface, and a top surface.

(b) The bottom surface is located adjacent and opposite to a substrate of an equipment. The motor has on this bottom surface, pairs of terminals that can be mechanically or electrically joined with the substrate of the equipment. The pairs of terminals are arranged on both sides around a line passing through the centroid or center of gravity of the bottom surface.

(c) The motor comprises a stator, a bearing device, and a rotor, all inside the housing. The stator has a stator core and a coil wound around the stator core. The rotor has a magnet and is supported by the bearing device so as to rotatably surround the periphery of the stator.

(d) The rotor further includes unbalance means.

With these terminals, the motor can be joined with the substrate of the equipment by reflow soldering method (solder joint). The housing facilitates handling of the motor. When prevented from protruding from the bottom surface area outward sideways, the terminals on the bottom surface can be arranged close to adjacent electronic parts. In addition, through the terminals may further protrude perpendicularly from the bottom surface so as to engage with holes in the substrates of the equipment, such an embodiment that the terminals are surface-connected to the substrate of the equipment is essentially desirable for the equipment.

In addition, since the terminals are arranged so as not to concentrate in part of the bottom surface, they can cooperate in efficiently bearing an impact, thereby providing a large holding force. Desirably, the impact can be more evenly shared by arranging the terminals point-, line-, or rotation-symmetrically around the centroid or center of gravity of the bottom surface.

According to more detailed explanation, the expression "center of gravity" may be paraphrased as a point where the center of gravity on the whole is vertically projected on the bottom surface. Furthermore, the centroid means the center of gravity on a plane figure.

A flat brushless motor according to a second embodiment of the present invention is adapted to meet the following requirements:

(a) The motor has a housing comprising a bottom surface, a side surface, and a top surface.

(b) The bottom surface is located adjacent and opposite to a substrate of an equipment. The motor has on this bottom surface, pairs of terminals that can be mechanically or electrically joined with the substrate of the equipment. The pairs of terminals are arranged on both sides around a line passing through the centroid or the center of gravity of the bottom surface.

(c) The motor comprises a stator, bearing device, and a rotor, all inside the housing. The stator has a stator core and a coil wound around the stator core. The rotor has a magnet and is supported by the bearing device so as to rotatably surround the periphery of the stator.

(d) External drive means that rotate with the rotor protrudes from part of the housing.

Preferably, the external drive means protruding from the housing is, for example, a shaft, a gear, a pulley, or part of the rotor. It reasonably protrudes from the top surface but may protrude from the bottom surface or part of the side surface depending on the requirements on the equipment.

A flat brushless motor according to a third embodiment of the present invention is adapted to meet the following requirements:

(a) The motor has a housing comprising a bottom surface, a side, and a top surface.

(b) The bottom surface is located adjacent and opposite to a substrate of equipment. The motor has on the side of the housing, pairs of terminals that protrude from the side approximately at the same height as the bottom surface and that can be mechanically or electrically joined with the substrate of the equipment. The pairs of terminals are arranged on both sides around a line passing through the centroid or center of gravity of the bottom surface.

(c) The motor comprises a stator, a bearing device, and a rotor, all inside the housing. The stator has a stator core and a coil wound around it. The rotor has a magnet and is supported by the bearing device so as to rotatably surround the periphery of the stator.

(d) The rotor further comprises unbalance means.

In this manner, the terminals protrude from the side of the housing, so these terminals can be provided in addition to the terminals within the bottom surface area to further increase the number of terminals, thereby increasing fixing strength. This configuration may also correspond to the reflow method that locally heats the protruding terminals.

A flat brushless motor according to a fourth embodiment of the present invention is adapted to meet the following requirements:

(a) The motor has a housing comprising a bottom surface, a side, and a top surface.

(b) The bottom surface is located adjacent and opposite to a substrate of equipment. The motor has on the side of the housing, pairs of terminals that protrude from the side approximately at the same height as the bottom surface and that can be mechanically or electrically joined with the substrate of the equipment. The pairs of terminals are arranged on both sides around a line passing through the centroid or center of gravity of the bottom surface.

(c) The motor comprises a stator, a bearing device, and a rotor, all inside the housing. The stator has a stator core and a coil wound around the stator core. The rotor has a magnet and is supported by the bearing device so as to rotatably surround the periphery of the stator.

(d) External drive means that rotate with the rotor further protrudes from part of the housing.

In this manner, the terminals protrude sideways of the housing, as in the motor according to the third embodiment, so these terminals can be provided in addition to the terminals within the bottom surface area to further increase the number of terminals, thereby increasing fixing strength. This configuration may also correspond to the reflow method that locally heats the protruding terminals. A flat brushless motor according to a fifth embodiment of the present invention is adapted to meet the following requirements:

(a) The motor has a housing comprising a bottom surface, a side surface, and a top surface and further comprising a chuck section.

(b) The bottom surface is located adjacent and opposite to a substrate of equipment. The motor has on the bottom surface or side of the housing, pairs of terminals that can be mechanically or electrically joined with the substrate of the equipment. The pairs of terminals are arranged on both sides around a line passing through the centroid or center of gravity of the bottom surface.

(c) The motor comprises a stator, a bearing device, and a rotor, all inside the housing. The stator has a stator core and a coil wound around it. The rotor has a magnet and is supported by the bearing device so as to rotatably surround the periphery of the stator.

(d) The rotor further comprises unbalance means.

This housing enables the motor to be transferred by using a loading chuck of an automatic electronic parts assembly machine and then to be automatically loaded on and soldered to the substrate of the equipment. The chuck section desirably accommodates a suction chuck, a grip chuck, and a magnet chuck, as shown below.

A flat brushless motor according to a sixth embodiment of the present invention is adapted to meet the following requirements:

(a) The motor has a housing comprising a bottom surface, a side surface, and a top surface and further comprising a chuck section.

(b) The bottom surface is located adjacent and opposite to a substrate of equipment. The motor has on the bottom surface or side of the housing, pairs of terminals that can be mechanically or electrically joined with the substrate of the equipment. The pairs of terminals are arranged on both sides around a line passing through the centroid or center of gravity of the bottom surface.

(c) The motor comprises a stator, a bearing device, and a rotor, all inside the housing. The stator has a stator core and a coil wound around the stator core. The rotor has a magnet and is supported by the bearing device so as to rotatably surround the periphery of the stator.

(d) External drive means that rotate with the rotor further protrudes from part of the housing.

As in the motor according to the fifth embodiment, this housing enables the motor to be transferred by using a loading chuck of an automatic electronic parts assembly machine and then to be automatically loaded on and soldered to the substrate of the equipment. The chuck section desirably corresponds to a suction chuck, a grip chuck, and a magnet chuck, as shown below.

In addition, according to the flat brushless motor of the present invention, the chuck section comprises a sucked surface that is located on the top surface and to which a suction chuck can be opposed. This sucked surface enables the motor to corresponds to suction chucks most commonly used in electronic parts assembly machines. The size of the sucked surface on the top surface conforms to many automatic assembly machines if the surface is flat and has a diameter of at least 3 mm or more and desirably 4 mm or more. The sucked surface may be shaped like a ring. Both an inclined surface and a spherical surface can be chucked.

In addition, according to the brushless motor of the present invention, the chuck section comprises two parallel planes located on the side and extending approximately perpendicularly to the bottom surface or two parallel ridges located on the side and extending parallel with the bottom surface. This configuration enables the electronic parts assembly machine to easily grip, load, and align the motor and also enables alignment to be checked easily. Alignment can also be carried out by using a grip chuck to clamp the two parallel ridges extending parallel with the bottom surface. If the motor appears like an n-gon as seen from the top surface ((n) is an even number larger than or equal to four), the shape of the motor is similar to a circle and thus serves to save space, while it allows the motor to be gripped by the chuck. If the motor appears like an oval or a similar shape as seen from the top surface, this shape contributes to further enlarging the internal space and is preferable in housing inside other electronic parts such as a drive circuit. If the motor appears like two parallel lines located adjacent to the outer circumference of a circle as seen from the top surface, the shape of the motor is very similar to a circle and thus serves to save space, while it allows the motor to be gripped by the chuck. If the motor appears like a combination of a base having two parallel planes and a cylinder, a cover shaped like a cylindrical cup can be easily produced to reduce costs. If an arch-shaped cover is mounted on the base in such a way as to surround the outside of the rotor, then despite the lack of protection for the inside of the motor, the arch-shaped cover contributes to saving resources to reduce costs.

In addition, the chuck section of the brushless motor of the present invention comprises a ferromagnetic member forming the top surface. This ferromagnetic member on the top surface enables the motor to be transferred by an automatic assembly machine using a magnet chuck. The ferromagnetic member is preferably a plated copper plate or a magnetic stainless steel plate.

In addition, the brushless motor of the present invention further has on the top surface or side, a marking for enabling the mounting direction of the motor to be determined. With this marking for enabling the mounting direction of the motor to be determined, the motor can be loaded in the correct direction by using an automatic assembly machine. The marking may exhibit a reflectance or magnetic reaction different from that of the periphery or may protrude or be recessed relative to the periphery. The method is selected depending on the structure and size of the motor and the configuration of an equipment assembly facility.

In addition, according to the brushless motor of the present invention, the number of terminals on the bottom surface is larger than the number of poles required for electric connections. Thus, the bottom surface has the large number of terminals including those required for electric connections, thereby increasing the strength with which the motor is mounted on the substrate to improve the impact resistance. In any of the motors, the basic concept is that the terminal has a high mechanical junction function for supporting a required weight, but separate holding means may be added that comprises an elastic body placed between the top surface and the enclosure of the equipment. The terminal may be formed of a land, a plate, a wire, or a headed pin. The bottom surface need not be the overall bottom surface but may be substantially formed of the bottom-side end surfaces of the side walls. In addition, although a configuration in which an output shaft for obtaining an output does not protrude to the exterior is preferable in protecting the interior, the rotor may partly protrude as required.

In addition, according to the flat brushless motor of the present invention, the top surface and side of the housing approximately surround the overall circumference of the rotor. In this manner, the outer rotor is further covered by the housing so as to be shielded, so the inside can be protected from the entry of hot blasts or dusts. Thus, this motor is suitable for the reflow method.

In addition, a tape-like package according to the present invention has a plurality of embosses arranged in series and in which the flat brushless motor is accommodated. Thus, the motor is supplied from the tape-like package, it can be efficiently mounted on the substrate of the equipment like electronic parts, using an automatic assembly machine.

In addition, a portable information equipment according to the present invention comprises the flat brushless motor of the present invention. Accordingly, the motor having the above characteristics can be reliably mounted so as to provide a high productivity, thereby increasing the value of the equipment.

In addition, the flat brushless motor of the present invention has a positioning member protruding from the bottom surface. Since the bottom surface has the positioning member for positioning relative to the relevant equipment, the external drive means can be accurately mounted. The positioning member is reasonably formed coaxially with the bearing device.

Next, a motor base connector according to the present invention is adapted to meet the following requirements:
(a) The motor base connector comprises motor bases each using a plate-like material as a base material.
(b) The motor base connector comprises a plurality of motor bases and a skeleton that remains after these motor bases have been punched out.
(c) The plurality of motor bases are pushed back and held in the skeleton.

Pores for positioning the skeleton are preferably provided in the skeleton. These structures allow the motor bases to be held by the skeleton, so this motor base connector is suitable for automatic assembly. In addition, by providing slit near the motor base in the skeleton, stress in the skeleton caused by the push-back is reduced to alleviate warp and deformation.

The motor base is a plate having a bottom surface, a stator mounting surface opposed to the bottom surface, and an outer circumferential side, the stator mounting surface having the stator fixed thereto. The motor base is desirably a printed circuit board, a ceramic substrate, or a metal substrate comprising a plate-like insulating material as a base material. In particular, double-side printed circuit boards are most preferable because they serve to reduce the size and weight of the motor.

In addition, a brushless motor assembly method according to the present invention is adapted to meet the following requirements:
(a) The motor base connector, the stator, the bearing device, and the rotor are used.
(b) Each motor base has a stator mounting surface and a bottom surface. The method comprises the steps of fixing the bearing device and the stator to the stator mounting surface, assembling the rotor on the bearing device, and removing the motor from the skeleton.

In this manner, the motor base can be handled as a connector, so the position and direction of the motor base can be regulated very accurately and a high-quality motor can be promptly assembled using a parts mounting machine. In addition, since no shearing operation is used to remove the motor from the skeleton, there is no possibility of quality degradation caused by an impact associated with shearing.

The method may include the steps of heating and hardening an adhesive for all the motors, carrying out batch reflow soldering, installing a cover, or conducting inspections, or as required. In addition, the motor may have either a cored outer rotor structure or a planar opposed core-less structure, but in the planar opposed core-less type, the motor can act as a magnetic path if the motor base comprises an iron substrate.

In addition, a brushless motor according to a seventh embodiment of the present invention is adapted to meet the following requirements:

(a) The motor comprises a stator, a base, a bearing device, and a rotor.

(b) The stator has a stator core and a coil wound around the stator coil.

(c) The base is a plate-like substrate comprising an electric insulating material as a base material and having a bottom surface, a stator mounting surface opposed to the bottom surface, and an outer circumferential side. At least part of the outer circumferential side or two or more portions thereof are exposed so as to be held by a skeleton. The bearing device and the stator are fixed coaxially to the stator mounting surface. Pairs of terminals are arranged on the bottom surface or the stator mounting surface.

(d) The rotor has a rotor yoke and a magnet fixed to the rotor yoke. The rotor yoke surrounds the periphery of the stator and is rotatably supported by the bearing device.

The base is desirably a resin substrate or a printed circuit board. With this base, the external size of the motor can be made as small as the diameter of the rotor by attaching the terminals to the bottom surface and the stator side and electrically connecting the terminals together through the plate material. The terminal may be formed of a land, a plate, a wire, or a headed pin. In addition, since at least part of the outer circumferential side or two or more portions thereof are exposed so as to be held by the skeleton, a reasonable assembly method can be provided in which the motor base is transferred as a connector.

Furthermore, in the brushless motor according to the present invention, the base is a double-side printed circuit board, and a plurality of lands are provided on each of the bottom surface and the stator side. This base comprising a double-side printed circuit board provides a heat resistance for soldering in motor assembly, a mechanical strength for holding the motor, and a compatibility with a method for transferring the motor by holding its outer circumferential side. By connecting the mutually corresponding lands together via through-holes, electric connections can be established while providing a light and compact motor. In addition, by providing through-holes in an outer circumference punching section, the cover can be inserted into the through-holes and fixed at the outer circumferential end of the motor base. This configuration is preferable in providing a cover having approximately the same size as the motor base.

Moreover, the portable information equipment according to the invention comprises a brushless motor which is surface-mounted on the substrate of the equipment. Thus, without providing fixing holes or the like in the substrate of the equipment, the motor can be firmly mounted with high efficiency and high density, thereby realizing miniaturization of the equipment and improvement of the productivity.

Further, the portable information equipment according to the invention includes a larger number of lands adapted for fixation of the motor of the equipment than the number of poles necessary for electrical connection of the brushless motor. As a result, the motor can be retained in a wide area and at a large number of positions, which improves the impact resistance of the equipment.

Still further, the portable information equipment according to the invention is configured such that the cover of the brushless motor is electrically grounded to the substrate of the equipment, whereby electromagnetic noise caused by the motor drive current can be shielded by the cover and the radiation noise be reduced.

Still further, the motor to be incorporated in the portable information equipment according to the invention is accommodated in a tape-like package to be supplied, and is then surface-mounted on the substrate of the equipment. Therefore, the motor can be incorporated in the equipment in a typical electronic parts assembly production line, leading to improvement of the productivity.

DESCRIPTION OF THE EMBODIMENTS

Embodiment 1

Figure 1A:
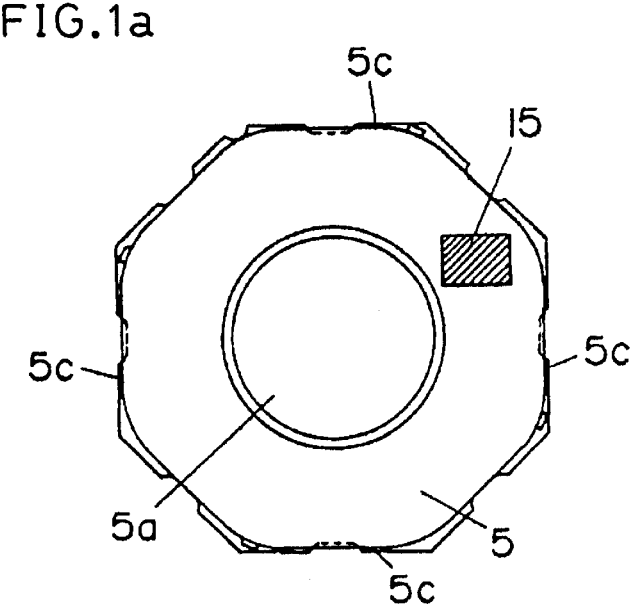
FIG. 1a is a top view of a motor according to Embodiment 1 of the present invention.
Figure 1B:
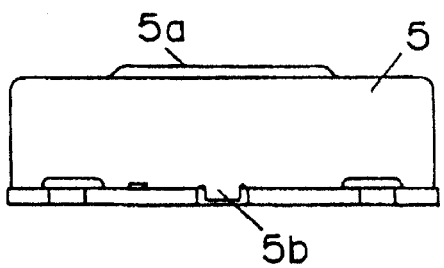
FIG. 1b is a side view of the motor.
Figure 1C:
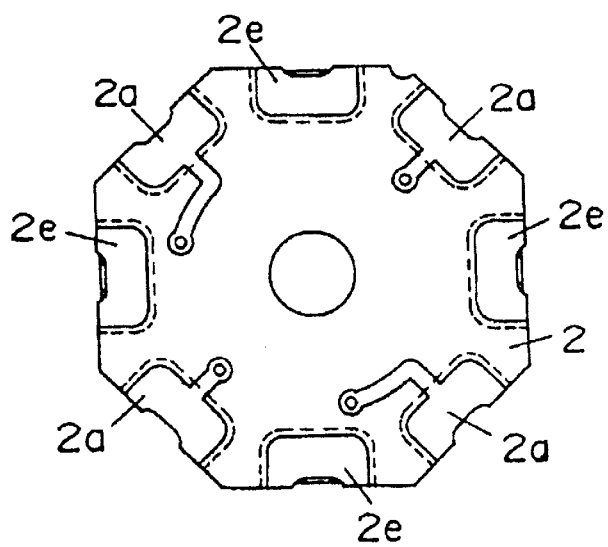
FIG. 1c is a bottom view of the motor.
Figure 2:
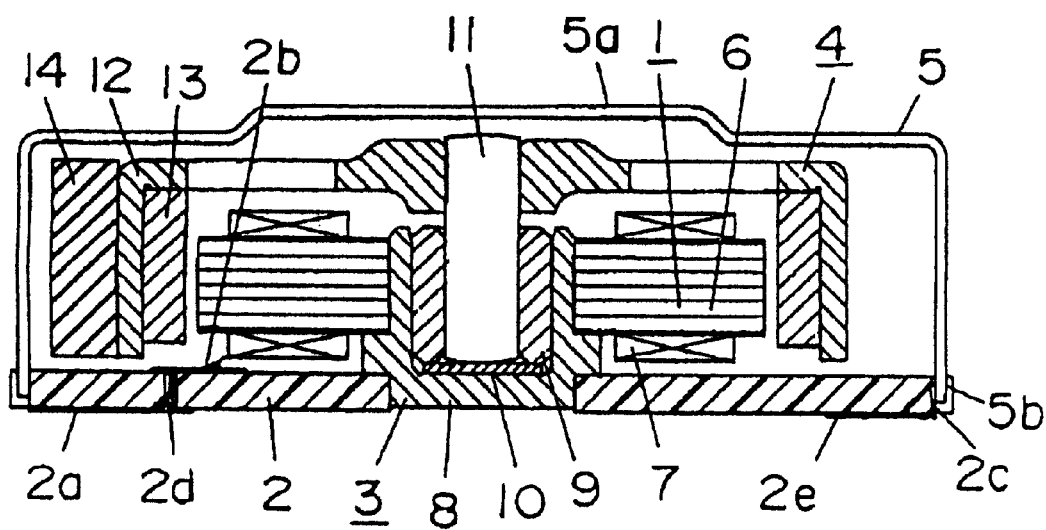
FIG. 2 is a structural sectional view of the motor.
Figure 3A:
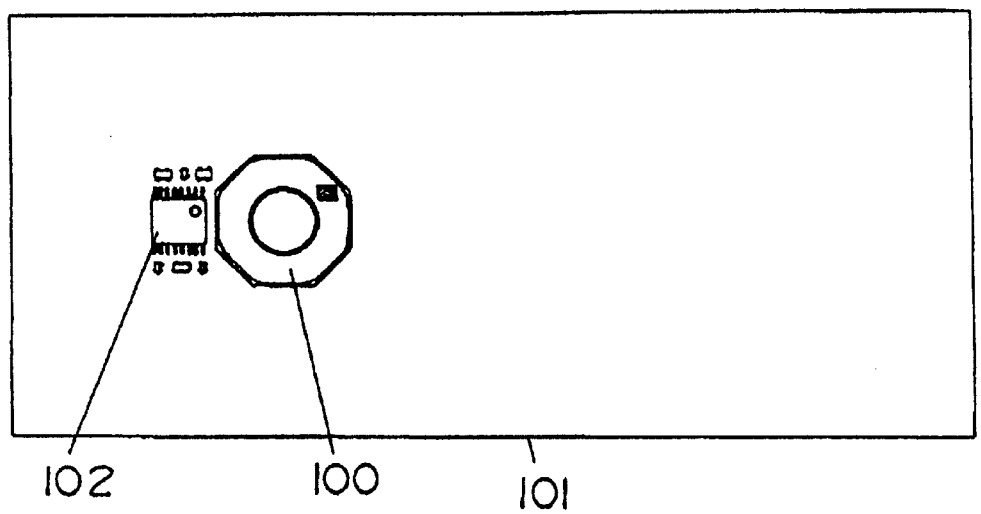
FIG. 3a is a top view showing a state in which the motor is mounted on a substrate of equipment.
Figure 3B:
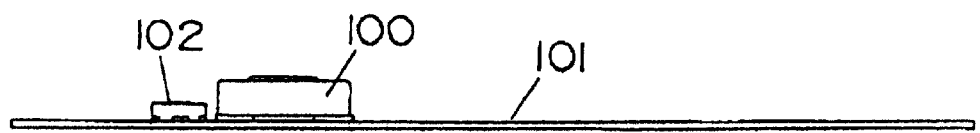
FIG. 3b is a side view of this state.

FIG. 1a is a top view of a motor according to Embodiment 1 of the present invention. FIG. 1b is a side view of this motor. FIG. 1c is a bottom view of this motor. FIG. 2 is a structural sectional view of the motor. FIG. 3a is a top view showing a state in which the motor is mounted on a substrate of equipment. FIG. 3b is a side view of this state.

In FIG. 1, a housing of a motor has a flat shape having a top surface, a side, and a bottom surface. The housing appears like an octagon as seen from the top surface. A sucked surface 5a to which a suction chuck can be opposed is located approximately at the center of the top surface. The side is surrounded by eight wall surfaces all over the circumference.

In FIG. 2, the motor comprises a stator 1, a printed circuit board 2, a bearing device 3, a rotor 4, and a cover 5. The cover 5 principally forms the top surface and the side, and the printed circuit board 2 forms part of the side and the bottom surface.

The stator 1 is formed by covering the surface of a stator core 6 with an insulating film and then winding a coil 7 around the film. The printed circuit board 2 comprises a double-side through-hole substrate. The printed circuit board 2 has a bottom surface, a stator mounting surface opposed to the bottom surface, and an outer circumferential side.

A plurality of lands 2a, 2e are located on the bottom surface of the printed circuit board 2. FIG. 1c shows their shapes as seen from the top surface. A plurality of lands 2b are also located on the stator mounting surface. A solderable metal surface 2c is formed on the outer circumferential side. The metal surface 2c is formed simultaneously with a through-hole 2d.

The bearing device 3 and the stator 1 are coaxially fixed to the stator mounting surface of the printed circuit board 2. The terminal of the coil 7 on the stator core 6 is soldered to the land 2b on the stator mounting surface. The land 2b is electrically connected to the land 2a on the bottom surface via the through-hole 2d.

The bearing device 3 is configured by a bottomed housing 8, a oil-containing metal 9, a thrust receiver 10, and a shaft 11 inserted into the thrust receiver 10 and one end of which is fixed to the center of the rotor 4.

The rotor 4 has a rotor yoke 12 and a magnet 13 fixed to the rotor yoke 12, and the shaft 11 is fixed to the center of the rotor yoke 12. The rotor yoke 12 surrounds the periphery of the stator 1 and is rotatably supported by the bearing device 3. The rotor 4 further has unbalance means. There are various means for obtaining unbalance, but this embodiment does so by fixing a circular weight 14 to the outer circumference of the rotor yoke 12.

As described above, the cover 5 is shaped approximately like an octagonal cup having the top surface, the side, and the end located at the tip of the side, and is a light shell comprising a thin metal. The cover 5 covers the rotor 4 and the end abuts on the neighborhood of the outer circumferential end of the stator mounting surface of the printed circuit board 2. As shown in FIG. 1b, a protruding portion 5b is further formed at the end and is soldered and fixed to the opposed metal surface 2c of the printed circuit board 2.

Figure 16:
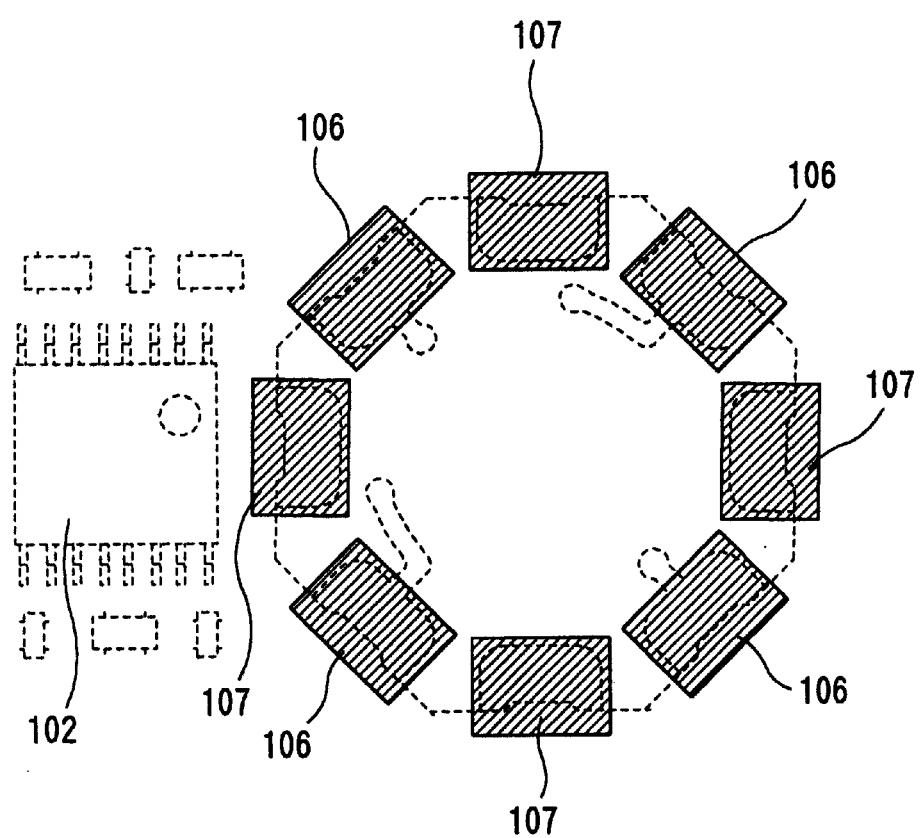
FIG. 16 is a top view showing lands for fixing a motor on the substrate of equipment together with the motor and its drive circuit (broken lines)

The motor configured as described above is directly mounted on a substrate 101 of equipment, as shown in FIG. 3. The substrate 101 is a double-side multilayer substrate on which other electronic parts are integrated and mounted, but these electronic parts are omitted. The motor 100 is reflow-soldered to the lands (106, 107 in FIG. 16) of the substrate of the equipment via the lands on the bottom surface (2a, 2e in FIG. 1). The land 106 functions to electrically and mechanically connect to the interior of the motor, and the land 107 functions to mechanically connect to the interior of the motor and to electrically ground the cover to the substrate. The substrate 101 of the equipment has a motor drive circuit (IC 102 or another electronic part) that excites and controls the stator 1 via the terminal (the land 2a). The motor drive circuit drives the magnet 13 to rotate the rotor 4. Since the rotor 4 has the unbalance means (the circular weight 14), vibration is transmitted to the equipment as the rotor 4 rotates, thereby enabling information such as a call or an alarm to be communicated to a user as a bodily sense.

Figure 17:
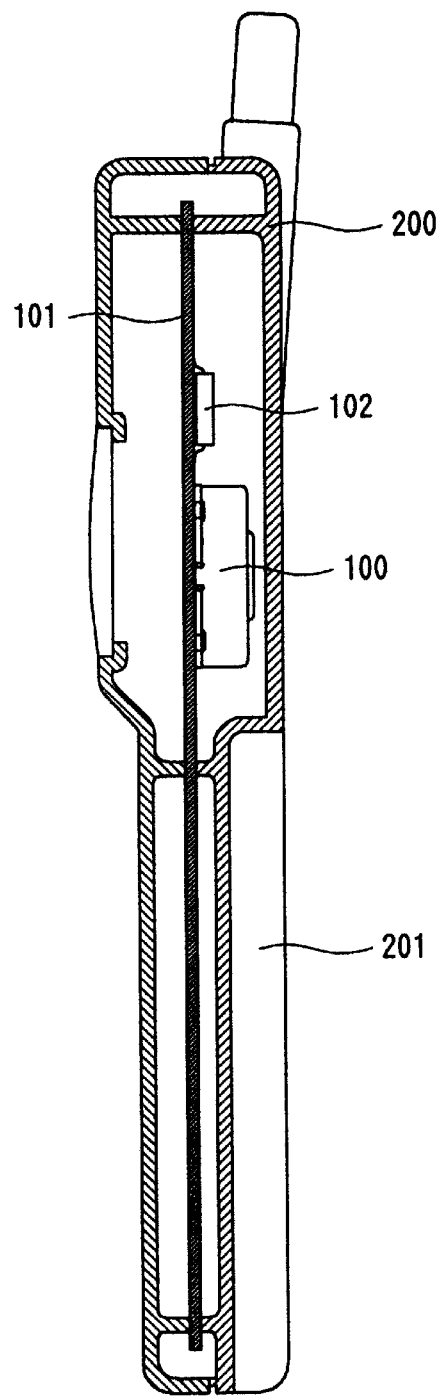
FIG. 17 is a side sectional view showing the equipment (cellular phone) incorporating a motor.

An example of the state in which a motor is incorporated in an equipment is shown in FIG. 17. The motor 100 and its drive circuit 102 are mounted on a substrate 101 as described above, and the substrate 101 is fixed in the interior of the equipment (cellular phone) 200. The equipment also includes a battery 201 as its drive source.

In this manner, in the motor of this embodiment, the pairs of terminals (the lands 2a, 2e) are arranged on the bottom surface so as to be spaced by an insulating section. The terminals can be soldered and connected to the substrate of the equipment by placing and heating them on the substrate, so this motor is suitable for the SMT mounting method and can be soldered by using the reflow method. If the terminals on the bottom surface are arranged so as not to extend from the bottom side area to protrude from the side as shown in FIG. 1, the interval between this motor and the adjacent electronic part can be reduced to enable high-density mounting. In addition, the terminals can further protrude perpendicularly from the bottom surface so as to engage with holes in the substrate of the equipment, where the terminals can be soldered to obtain a strong securing force. Essentially, however, it is desirable for the equipment to obtain a sufficient holding force by simply surface-connecting the motor to the substrate of the equipment, and the present invention is intended to meet this requirement.

The motor of this embodiment also has on the bottom surface the terminal (the land 2e) that is not involved in electric connections. As shown in FIG. 1c, eight lands 2a, 2e are formed on the bottom surface, but only four (the lands 2a) of them are involved in electric connections. The large number of lands can increase a coupling area for the substrate of the equipment and the motor to enable them to be coupled together firmly. This configuration can improve an impact resistance effected when the equipment is inadvertently dropped.

In addition, according to the motor of this embodiment, the plurality of lands 2a, 2e on the bottom surface are arranged on both sides around a line passing through the centroid of the bottom surface. In other words, the lands are arranged point-symmetrically. In may cases, the centroid of the bottom surface approximately aligns with the center of gravity of the motor, but the force obtained by synthesizing the holding forces of the terminals can be allowed to align with the center of gravity by arranging the terminals point-symmetrically. That is, an impact force can be evenly distributed to each terminal to maximize the impact resistance effected when the equipment is inadvertently dropped. Thus, a first point for improving the impact resistance is a technique for firmly supporting the motor using the solder-joined structure between the bottom surface of the motor and the substrate of the equipment.

In addition, the motor of this embodiment is approximately entirely surrounded by the enclosure. Thus, the inside of the motor can be protected from hot blasts or infrared rays used to melt a solder during a reflow process to prevent the internal motor structure from being destroyed by heating. Consequently, the heat resistance is improved to provide a motor preferable for the reflow soldering method. Since the bottom surface comprises a printed circuit board, the motor has a high heat resistance, an excellent heat insulating capability, and a small weight. In addition, the housing provides an easy-to-handle shape, so the motor can be efficiently mounted on the substrate of the equipment. Furthermore, it can prevent the entry of dust and thus a motor lock caused by dust to maintain the reliability of the motor.

In the brushless outer-rotor motor, the rotor has the function of a cover. There is no brush commutator mechanism to be protected, and the stator and the bearing device are covered by the rotor. Accordingly, there is conventionally no need to provide a cover. The present invention provides the external shape and the cover with many functions to create the brushless motor suitable for the SMT mounting method and the reflow method.

The motor of this embodiment also has the stator core 6 and the coil 7 wound around the stator core 6, and the rotor 4 rotatably surrounds the periphery of the stator 1. That is, the motor employs the cored outer rotor structure. This structure provides a magnetic circuit with a higher permeance than the coreless structure, and provides the same output using a smaller magnet. As a result, this structure can reduce the weight of the rotor and thus loads on the bearing device to improve the impact resistance. The reduced weight of the rotor is a second point for improving the impact resistance. As regards this, a planar opposed coreless motor and a cored outer-rotor motor having the same outer diameter and approximately the same characteristics were experimentally produced and compared to find that the magnet weight was 1.05 gw and 0.37 gw, respectively. In this manner, the cored outer-rotor type serves to reduce the weight of the rotor. If the weight is reduced by, for example, 0.5 gw, the loads on the bearing device can be reduced by 10 kgf in an environment of 20,000 G. Since the bearing device of this motor is very small, the reduction of the loads by 10 kgf is significant.

In addition, the cored outer rotor structure is flat and low. That is, this structure has its center of gravity at a low position. Consequently, when an impact force is effected in a direction parallel with the substrate of the equipment, a smaller moment is imparted to the terminal connections in a direction in which they are peeled off. Thus, this structure improves the impact resistance compared to a high profile of the same mass.

In addition, the motor of this embodiment has no brush commutator mechanism. Accordingly, it requires no axial space for this mechanism and can be made flat and low easily. As a result, for the same reason as described above, this structure improves the impact resistance compared to a high profile of the same mass. Naturally, this motor is not subjected to deformation or destruction of the brush commutator mechanism. Consequently, the internal structure can be made strong and simple to improve the impact resistance of the motor. Furthermore, the functions of the rectifying mechanism are prevented from decreasing due to a soldering or flux atmosphere, so this motor is preferable for the reflow soldering method.

As described above, a high impact resistance is obtained by using many techniques such as the technique for firmly supporting the motor using the soldered structure between the bottom surface of the motor and the substrate of the equipment, the light rotor, the low profile, the light housing (cover and printed circuit board), and the simple structure.

In addition, in the motor of this embodiment, the sucked surface 5a to which a suction chuck (an air chuck) can be opposed is provided approximately at the center of the top surface. According to this embodiment, the sucked surface is a circular flat surface of diameter about 6 mm. This surface can be used to suck and chuck the top surface. Since the air chuck is a chuck method that avoids interfering with the adjacent electronic part, the interval between the motor and the adjacent electronic part can be reduced. As a result, the motor can be efficiently mounted so as to achieve a high density.

In order to check the rotor for rotations, a hole may be formed at the center of the top surface to expose the shaft, but even in this case, a ring-like sucked surface enables easy air chucking. In addition, the air chuck is flexible, so it can also chuck a sucked surface that is not necessarily flat.

In addition, in the motor of this embodiment, the side includes two parallel planes 5c extending approximately perpendicularly to the bottom surface. If the planes 5c reach the top surface, part of the side located near the top surface of the motor can be gripped for loading to eliminate the need to chuck the neighborhood of the bottom surface, thereby precluding the grip chuck from interfering with the adjacent electronic part. Consequently, the interval between the motor and the adjacent electronic part can be reduced to enable the motor to be mounted efficiently so as to achieve a high density. Furthermore, this linear portion of the contour of the motor enables alignment without interference from the grip chuck. In this manner, alignment is facilitated and can be checked easily to improve the accuracy in mounting position and direction. Thus, the motor can be mounted on the substrate of the equipment so as to achieve a high density.

In addition, the motor of this embodiment appears like an octagon as seen from the top surface. This shape is similar to the circular shape of the rotor and occupies a smaller area of the substrate of the equipment. It also enables easy gripping and alignment. Thus, the motor can be mounted on the substrate of the equipment so as to achieve a high density.

In addition, in the motor of this embodiment, the material of the top surface (that is, the cover 5) is preferably a ferromagnetic substance (such as a steel plate). Such a top surface accommodates a magnetic chuck and enables the use of chuck means that replaces the air and grip chucks. This top surface is also convenient in forming a marking that uses magnetic reactions. The marking has only to be have a shape different from the periphery.

Furthermore, in the motor of this embodiment, a marking 15 that enables the mounting direction to be determined is provided on the top surface or the side. This configuration enables the mounting direction to be controlled for automatic loading. Even if the motor is packaged or supplied in the incorrect direction, the marking enables determination of the direction in which the motor is mounted. Thus, the motor can be mounted on the substrate of the equipment so as to achieve a high density. The marking according to this embodiment is a black stamp that exhibits a reflectance different from that of the periphery.

The marking may protrude or be recessed relative to the periphery. Advantages of such a marking are that it can be formed simultaneously with the member forming the top surface or the side (in this embodiment, the cover), using a mold for producing this member and that it can accommodate any of visual checking, a magnetic reaction, and a height sensor. This marking may be a method exhibiting a magnetic reaction different from that of the periphery, for example, a magnetic ink.

This motor has such an effective loading chuck to enable accurate alignment and mounting without directional errors. These functions provided for the housing enable the motor to be efficiently mounted on the substrate of the equipment like other solid electronic parts and to be placed close to them so as to achieve a high density.

The portable information equipment according to the invention is configured so that the motor cover is electrically grounded directly to the substrate of the equipment. As a result, electromagnetic noise, of which source is the stator core of the motor and the coil wound therearound, is shielded by the cover, as well as the cover and the substrate are mechanically combined to improve the impact resistance of the motor.

Embodiment 2

Figure 4A:
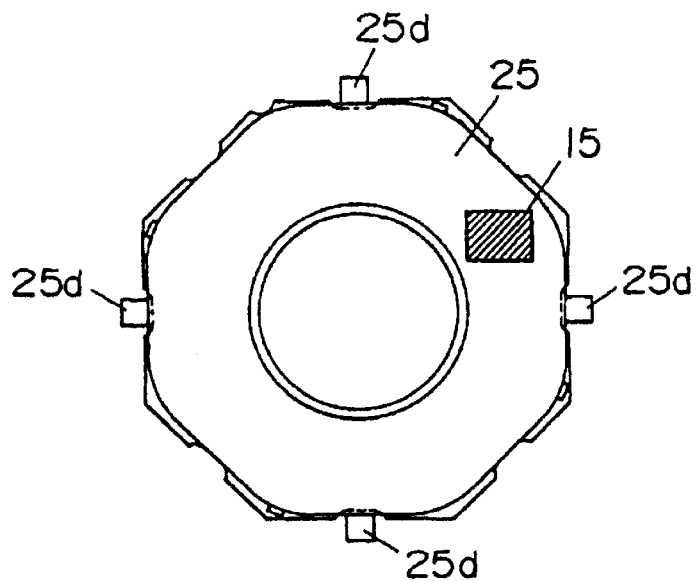
FIG. 4a is a top view of a motor according to Embodiment 2 of the present invention.
Figure 4B:
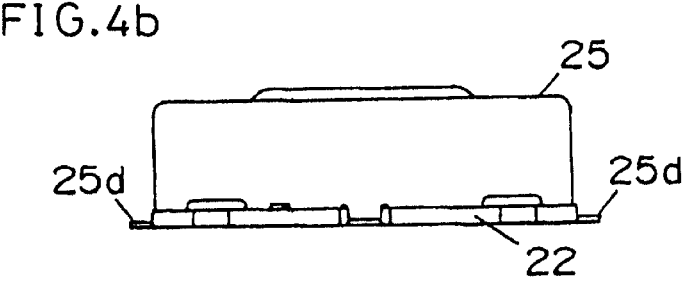
FIG. 4b is a side view of the motor.
Figure 4C:
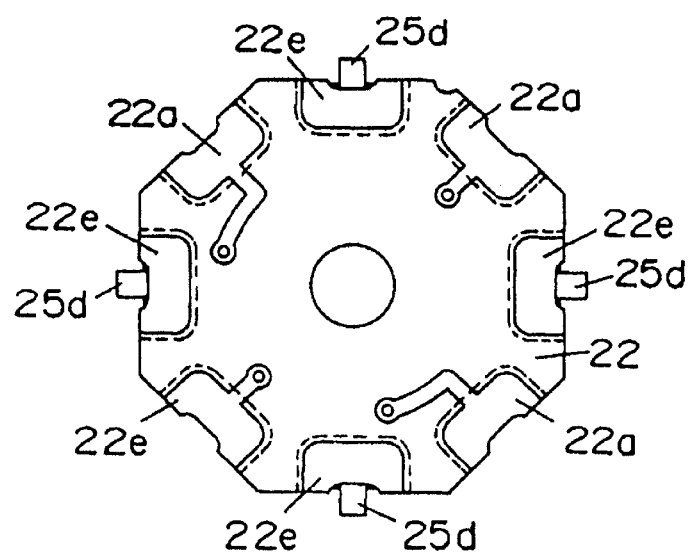
FIG. 4c is a bottom view of this motor.

FIG. 4a is a top view of another motor according to the present invention. FIG. 4b is a side view of this motor. FIG. 4c is a bottom view of this motor.

As shown in the figures, the motor of this embodiment has protruding terminals 25d protruding outward from the side. The protruding terminals 25d are formed by further extending the protruding portion of the cover 25. As shown in FIG. 4c, the eight lands 22a, 22e are located on the bottom surface and the protruding terminals 25d are added to these lands. As is apparent from FIG. 4b, the protruding terminals 25b are approximately flush with the lands 22a, 22e. When placed on the substrate of the equipment and reflow-soldered to it, the motor is fixed by means of the large number of terminals to obtain a higher holding strength.

In addition, although not shown, a structure can be employed in which the protruding terminals alone can provide both a mechanical junction function and an electric connection function. The protruding terminals can be joined with the substrate of the equipment using the reflow method of selectively heating only the terminals without heating the motor body. This method can reduce an increase in the temperature of the inside of the motor to enable reflow soldering without destroying the motor despite the presence of a motor component of a low heat resistance.

Variation of Embodiments 1 and 2

Figure 5A:
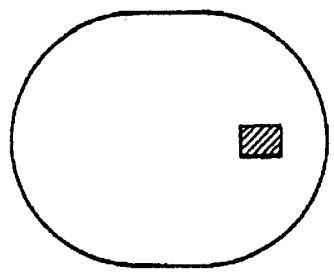
FIG. 5a is a geometrical top view of another motor shaped like an oval.
Figure 5B:
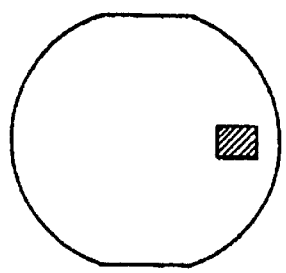
FIG. 5b is a similar geometrical view.
Figure 5C:
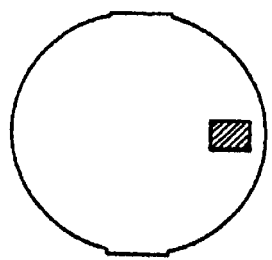
FIG. 5c shows two parallel lines located adjacent to the outer circumference of a circle.
Figure 5D:
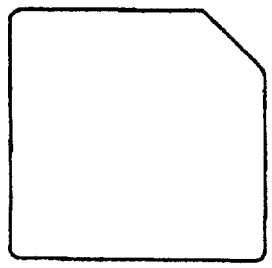
FIG. 5d shows a square one corner of which has been cut.

This section shows a variation of the planar shape. FIG. 5a is a top view of yet another motor that appears like an oval as seen from the top view. FIG. 5b shows a shape similar to that in FIG. 5a. FIG. 5c shows a shape in which two parallel lines are located adjacent to the outer circumference of a circle. FIG. 5d shows a square one as corner of which has been cut. The similar shape in FIG. 5b is obtained by cutting a circle using two parallel lines.

An oval or a similar shape is similar to a circle, so such a motor is characterized in that it can save space and be gripped and in that it has an internal space and is preferred in case of further incorporating electronic parts within the motor. The shape in FIG. 5c is very similar to a circle and saves space, thereby reducing an area of the substrate of the embodiment that is occupied by the motor. The shape in FIG. 5d can also be used as a marking for determining the direction.

Figure 6A:
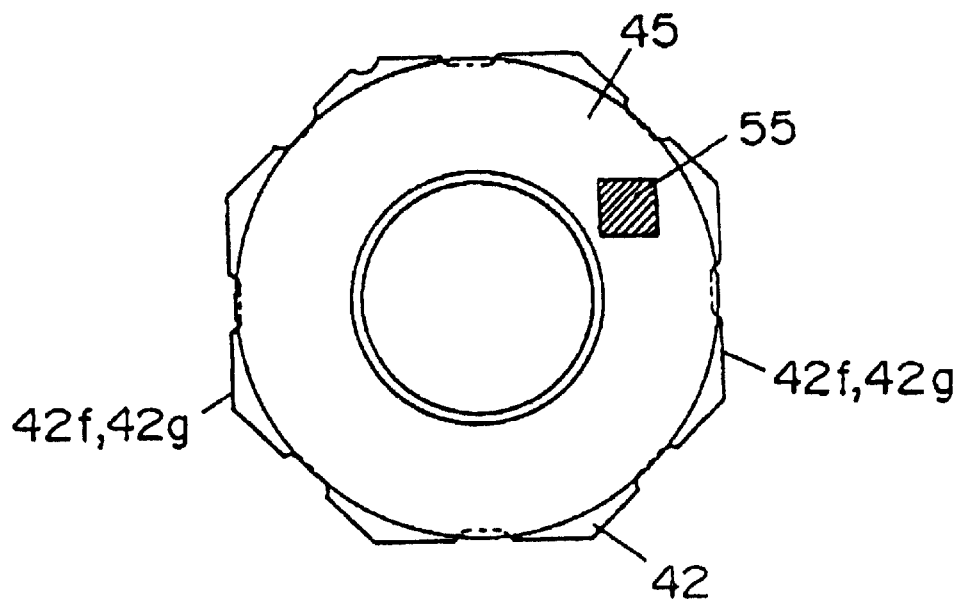
FIG. 6a is a top view of yet another motor according to the present invention.
Figure 6B:
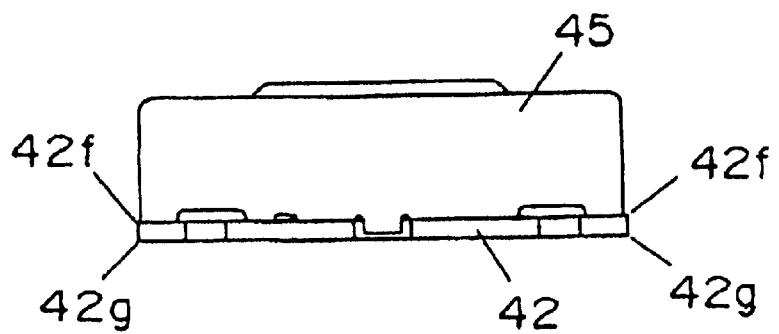
FIG. 6b is a side view of this motor.
Figure 7A:
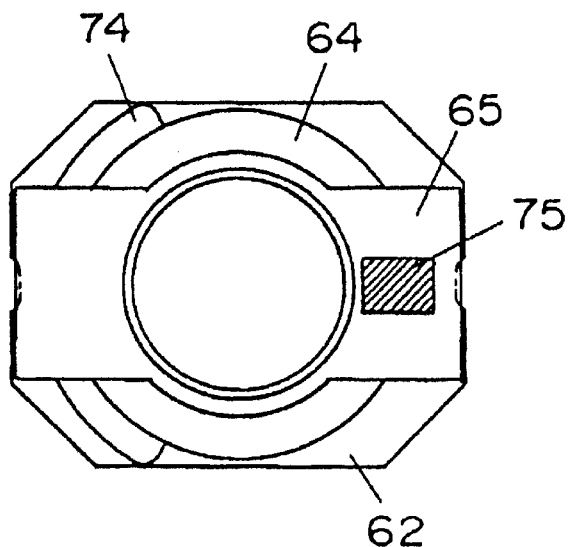
FIG. 7a is a top view of still another motor according to the present invention.
Figure 7B:
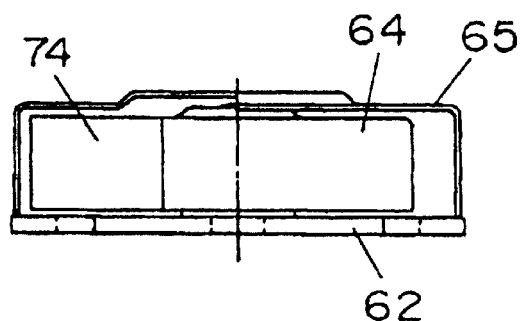
FIG. 7b is a side view of this motor.

FIG. 6a is a top view of a yet another motor according to the present invention. FIG. 6b is a side view of this motor. FIG. 7a is a top view of a still another motor according to the present invention. FIG. 7b is a side view of this motor.

The motor in FIG. 6 is formed by placing a cylindrical cover 45 on an octagonal printed circuit board 42. Since only the neighborhood of the bottom surface comprises the planar portion of the side of the motor, the top surface side is difficult to grip. Even in this case, however, an air chuck can be used to chuck the top surface to transfer the motor, and the position or direction can be corrected during the transfer. This structure is advantageous in that the cover 45 requires only low costs.

The "two parallel ridges located on the side and extending parallel with the bottom surface" set forth in the claims are, for example, ridges 42f in FIG. 6. These may be ridges 42g. Alignment can be carried out by gripping and pressing these ridges using a grip chuck. In this case, however, the bottom or top surface must be supported.

The motor in FIG. 7 is formed by placing an arch-shaped cover 65 on an octagonal printed circuit board 62. This structure cannot protect the inside of the motor from heat but reduces the weight and costs while saving resources. It can also reduce the occupied area of the printed circuit board 62.

Embodiment 3

Figure 8A:
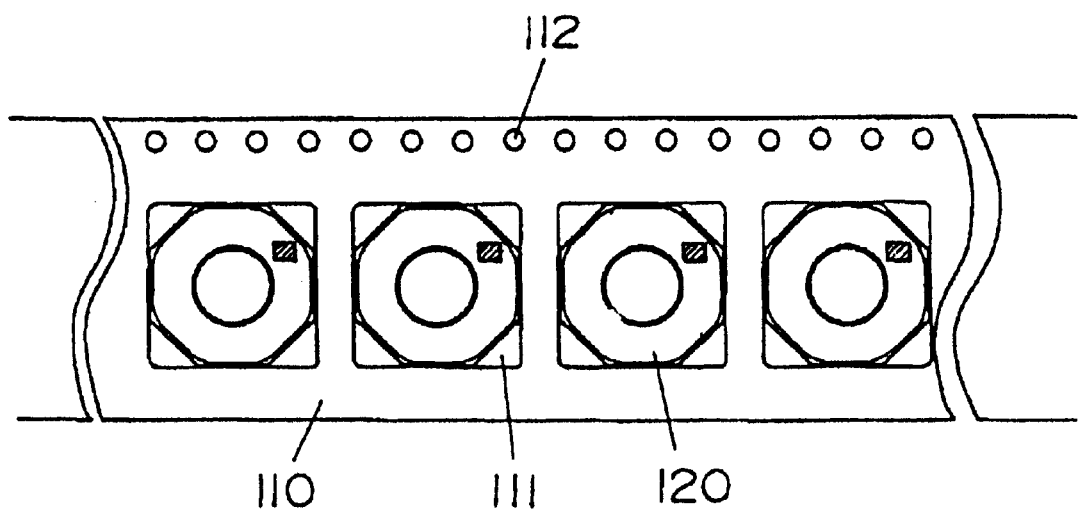
FIG. 8a is a top view of a tape-like package according to the present invention, 8b is a side view of this package.
Figure 8B:
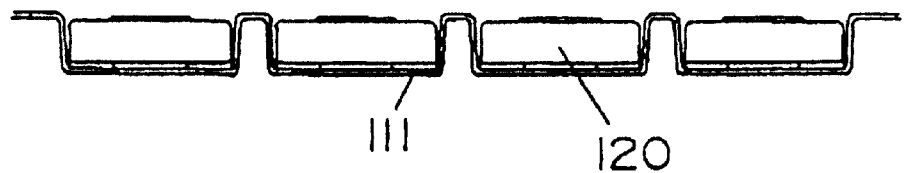

FIG. 8a is a top view of a tape-like package according to the present invention. FIG. 8b is a side view of this package.

As shown in the figures, a large number of embosses 111 are arranged in series in a tape-like package 110, with a flat vibrating motor 120 accommodated in each of the embosses. After accommodation, the embosses are covered with a film (not shown in the drawings). The package 110 also has sprockets 112 (feed holes) the sizes of which conform to the industrial standard. The package 110 is wound around a reel for supply. To mount the motors 120 on the substrate of the equipment, the motors are sequentially loaded using the reel.

Due to this packaging form suitable for automatic supply, these motors can be efficiently mounted on the substrate of the equipment using an automatic machine. This enables highly efficient collective assembly production of the equipment incorporating electronic parts including the motor. As described above, the present invention has cleared of the conventional brushless motor and altered the external shape, the internal structure, and even the supply form so that the motor can be handled like other solid electronic parts.

Embodiment 4

Figure 9A:
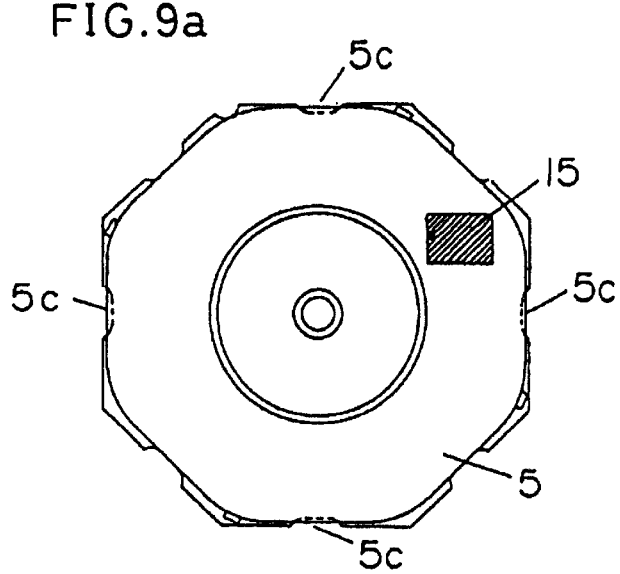
FIG. 9a is a top view of a motor according to Embodiment 4 of the present invention.
Figure 9B:
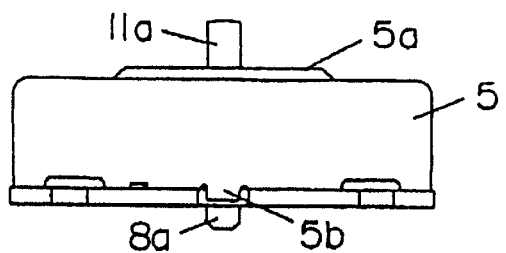
FIG. 9b is a side view of this motor.
Figure 9C:
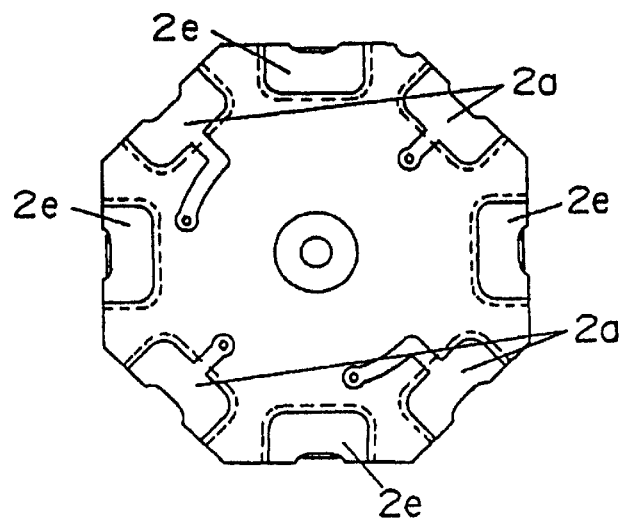
FIG. 9c is a bottom view of this motor.
Figure 10:
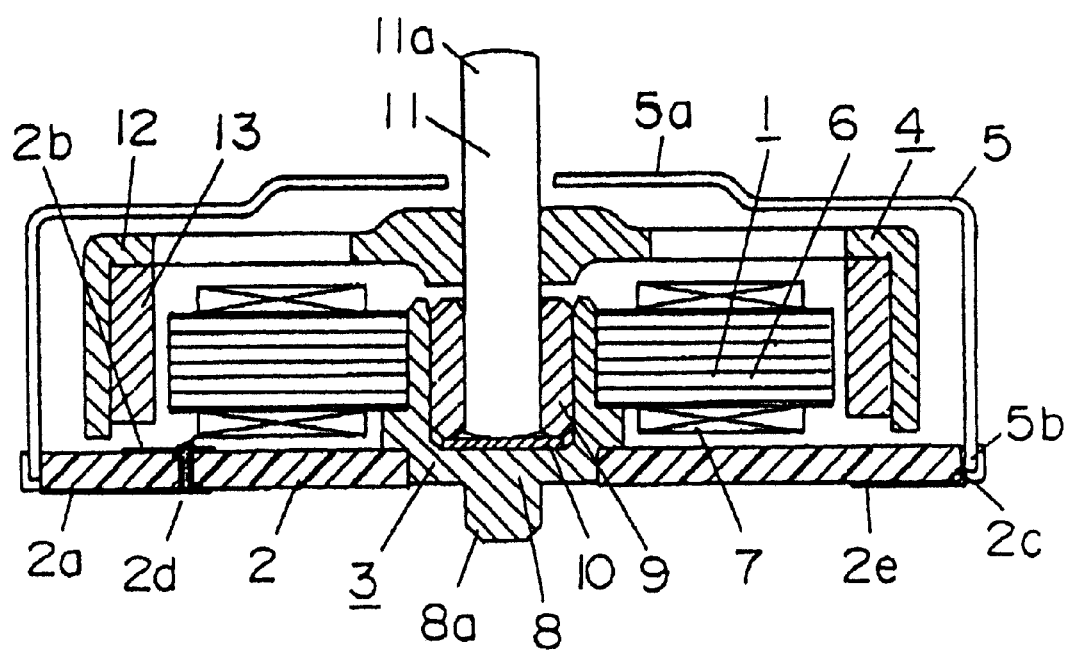
FIG. 10 is a structural sectional view of the motor.
Figure 11A:
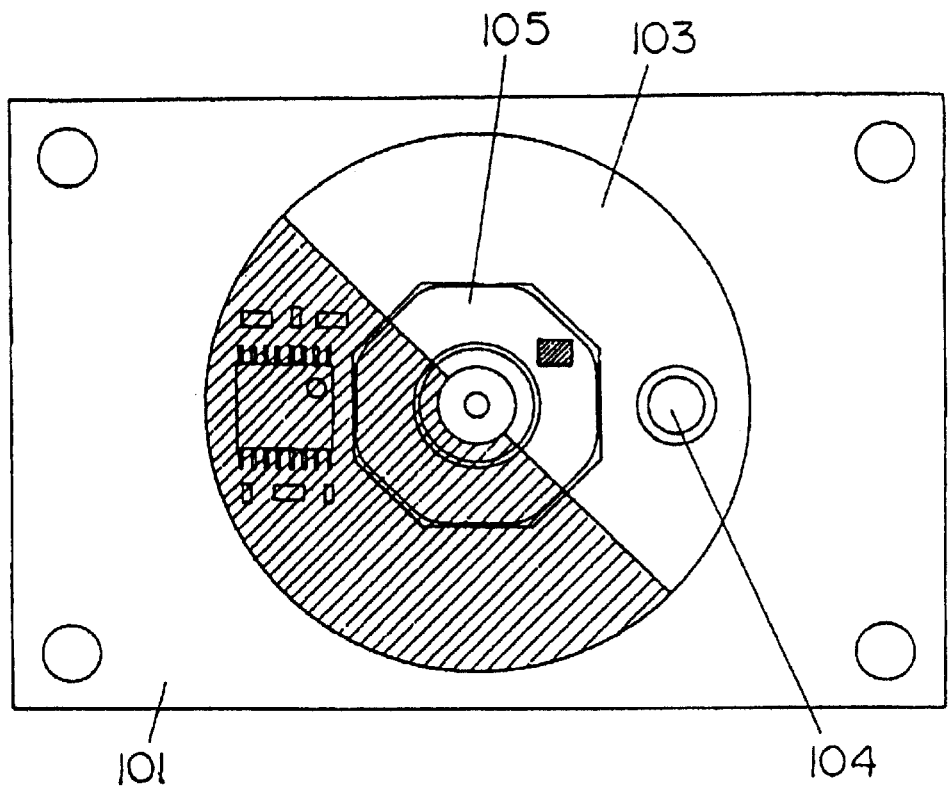
FIG. 11a is a top view showing a state in which the motor is mounted on a substrate of equipment.
Figure 11B:
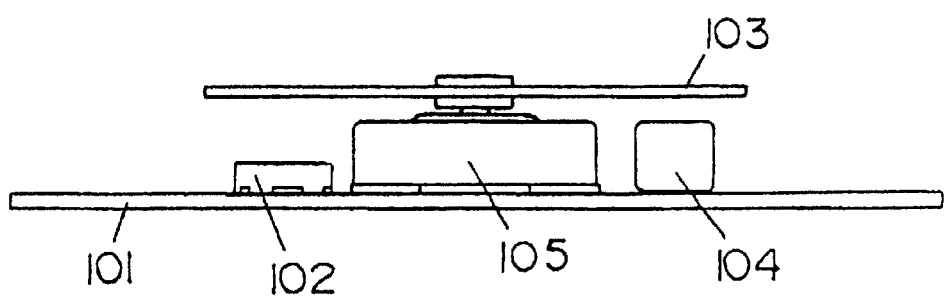
FIG. 11b is a side view of this state.

FIG. 9a is a top view of a motor according to Embodiment 4 of the present invention. FIG. 9b is a side view of this motor. FIG. 9c is a bottom view of this motor. FIG. 10 is a structural sectional view of this motor. FIG. 11a is a top view showing a state in which the motor is mounted on a substrate of equipment. FIG. 11b is a side view of this state.

In FIG. 9, a housing of a motor has a flat shape having a top surface, a side, and a bottom surface. The housing appears like an octagon as seen from the top surface. A sucked surface 5a to which a suction chuck can be opposed is located approximately at the center of the top surface. The side is surrounded by eight wall surfaces all over the circumference.

In FIG. 10, the motor comprises a stator 1, a printed circuit board 2, a bearing device 3, a rotor 4, and a cover 5. The cover 5 principally forms the top surface and the side, and the printed circuit board 2 forms part of the side and the bottom surface.

Although the vibrating motor of Embodiment 1 fixes a circular weight 14 to the outer circumference of a rotor yoke 12 as means for obtaining unbalance, the flat brushless motor of Embodiment 4 does not include the weight 14 because it is unwanted. Another major difference is that a shaft 11 is structured so that part 111a of it protrudes from the top surface of the cover in order to output a rotational drive force to the exterior of the motor and that part of a housing 8 protrudes from the bottom surface as a positioning member 8a.

This equipment has an infrared sensor function, and the motor is used as a chopper for infrared rays impinging on the sensor. An external drive means (a protruding portion 11a of the shaft) protrudes from the top surface to rotate a shading disc 103 attached to the external drive means, at a specified rotation speed. An infrared ray receiving element 104 is located behind the shading disc 103, and light incident on the infrared ray receiving element 104 is controlled by the motor 105.

In addition, since an air chuck is flexible, it can also chuck a surface that is not necessarily flat. This embodiment has a surface that can be sucked, in the outer circumference of a sucked surface 5a, and this surface can be chucked. Even in this case, a ring-like sucked surface enables easier air chucking.

Embodiment 5

Figure 12A:
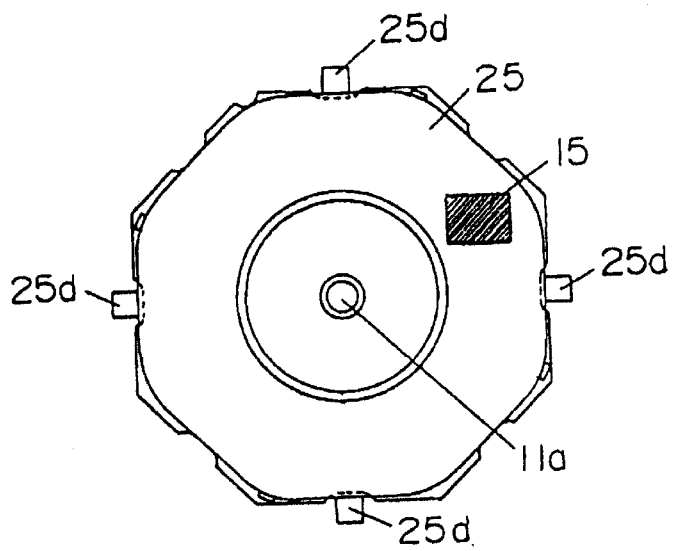
FIG. 12a is a top view of a motor according to Embodiment 5 of the present invention.
Figure 12B:
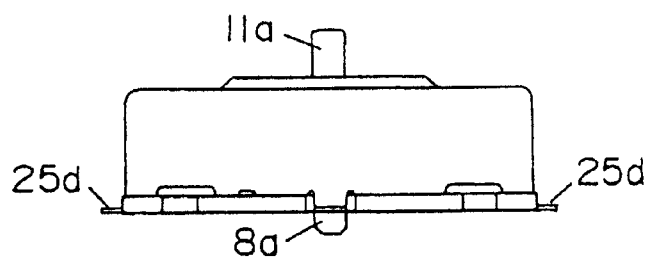
FIG. 12b is a side view of this motor.
Figure 12C:
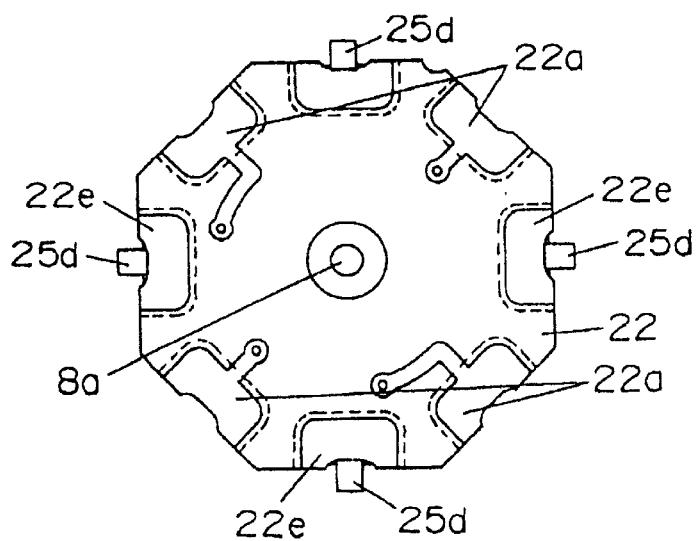
FIG. 12c is a bottom view of this motor.

FIG. 12a is a top view of a motor according to the present invention. FIG. 12b is a side view of this motor. FIG. 12c is a bottom view of this motor.

As shown in the figures, the motor of this embodiment has protruding terminals 25d protruding outward from the side, compared to the motor in Embodiment 4. The protruding terminals 25d are formed by further extending the protruding portion of the cover 25. As shown in FIG. 12c, the eight lands 22a, 22e are located on the bottom surface and the protruding terminals 25d are added to these lands. As is apparent from FIG. 12b, the protruding terminals 25b are approximately flush with the lands 22a, 22e. When placed on the substrate of the equipment and reflow-soldered to it, the motor is fixed by means of the large number of terminals to obtain a higher holding strength.

Embodiment 6

Figure 13A:
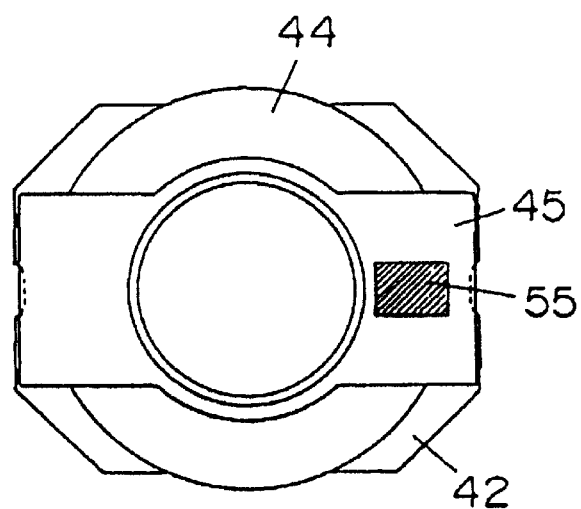
FIG. 13a is a top view of a yet another motor according to the present invention.
Figure 13B:
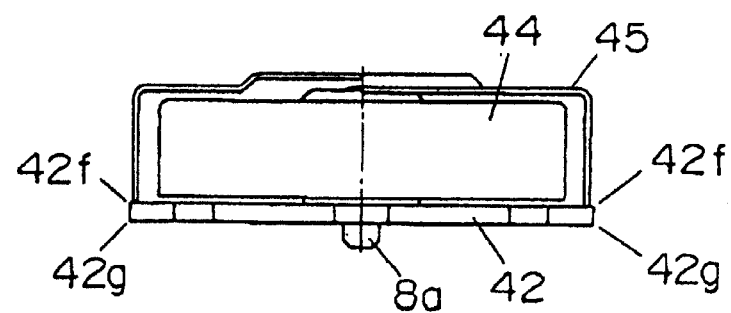
FIG. 13b is a side view of the motor.

FIG. 13a is a top view of a yet another motor according to the present invention. FIG. 13b is a side view of this motor.

The motor in FIG. 13 is formed by placing an arch-shaped cover 65 on an octagonal printed circuit board 62. Although this structure cannot protect the inside of the motor from heat but reduces the weight and costs while saving resources. It can also reduce an area of the printed circuit board 62 that is occupied by the motor. Since the rotor is partly exposed, the exposed portion can be used to frictionally drive the equipment.

The "two parallel ridges located on the side and extending parallel with the bottom surface" set forth in the claims are, for example, ridges 42f in FIG. 13. These may be ridges 42g. Alignment can be carried out by gripping and pressing these ridges using a grip chuck. In this case, however, the bottom or top surface must be supported.

In this manner, since the motor of the present invention can be surface-mounted on the substrate and has other excellent characteristics such as a very small size and weight and a high impact resistance, this motor can be used for various applications that take advantage from these characteristics. The applications may include portable information equipment, portable game equipment, head mount displays, and fans for locally cooling the substrate of the equipment.

Embodiment 7

Figure 14A:
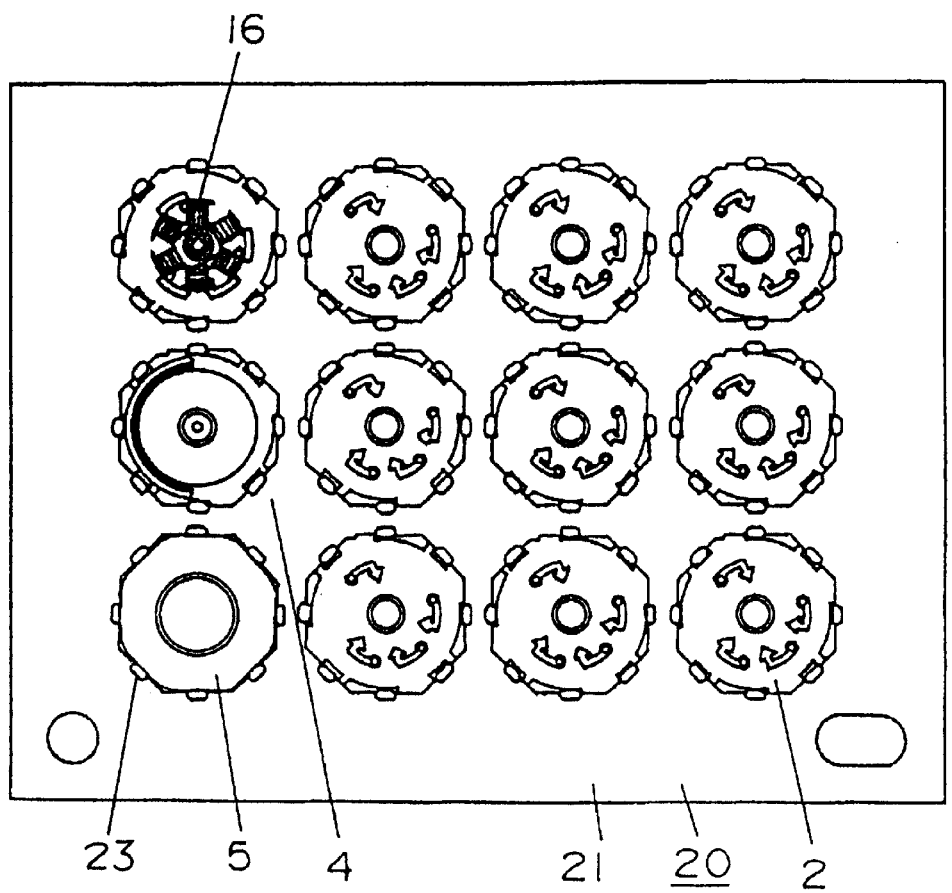
FIG. 14a is a top view showing a sequence in which motor parts are assembled on a motor base connector.
Figure 14B:
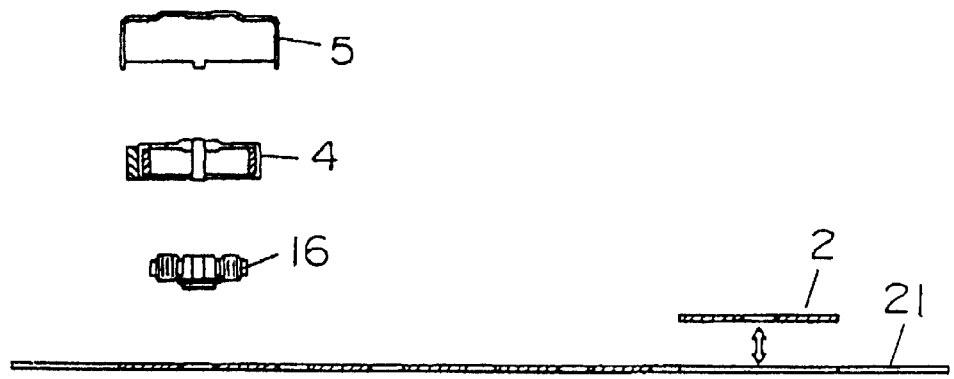
FIG. 14b is a side view of this sequence.
Figure 15A:
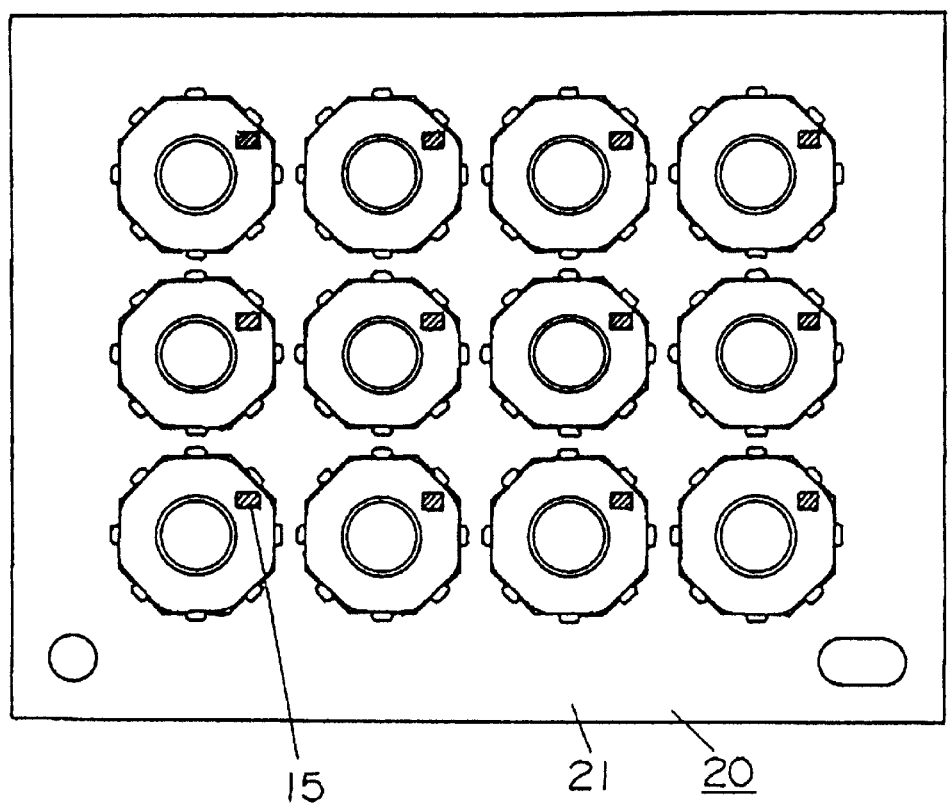
FIG. 15a is a top view showing a state in which motors have been assembled on the motor base connector.
Figure 15B:
FIG. 15b is a side view of this state.

FIG. 14a is a top view showing a sequence in which motor parts are assembled on a motor base connector. FIG. 14b is a side view of this sequence. FIG. 15a is a top view showing a state in which motors have been assembled on the motor base connector. FIG. 15b is a side view of this state.

In this embodiment, taking the same motors as described in Embodiment 1 (FIGS. 1 and 2) by way of example, a method for assembling these motors will be described with reference to FIGS. 14 and 15.

These motors are characterized by being assembled by using a motor base connector. In FIG. 14, a motor base connector 20 comprises 15 bases 2 (printed circuit boards 2) and their skeleton 21. This structure is obtained by punching the bases 2 in a punching process and pushing them back, as shown at the right end of FIG. 14b. This method is chiefly used to transfer a metal part to and from a press mold. The skeleton is a punching residue that remains after punching out the metal part.

Each of the bases 2 of the motor base connector 20 produced in this manner includes a top surface acting as a stator mounting surface; and a bottom surface opposed to the top surface. An adhesive and a cream solder are applied to the stator mounting surface beforehand to install an assembly 16 of the stator and bearing device on this surface. The rotor 4 is then inserted into the assembly, and the cover 5 is installed. Subsequently, a batch heating reflow soldering process is carried out to simultaneously complete the adhesion between the base 2 and the assembly 16 of the stator and bearing device, the solder-connection between the terminal of the coil 7 and the land 2b, and the solder-fixation between the cover 5 and the metal surface 2c on the outer circumferential surface of the base 2.

During this process, the end of the side of the cover 5 abuts on the outer circumferential end of the base, and the protruding portion 5b is inserted into an oval through-hole 23 in the boundary between the base 2 and the skeleton 21. The protruding portion 5b is solder-fixed to the metal surface 2c that has been formed in the oval through-hole 23.

Once motors have been assembled as shown in FIG. 15, a probe is applied to the lands 2a on the bottom surface of each motors for inspections. Acceptable products are provided with the marking 15 and are individually removed as shown at the right end of FIG. 15b, followed by packaging for shipment.

Alternatively, the motors may be shipped without being removed. In this case, since the aligned motors are supplied, they can be conveniently mounted on the equipment using an automatic assembly machine.

As described above, the motor of this embodiment is assembled by using the motor base connector 20 to place each part thereon. This method accurately positions and holds the motor base 2 to eliminate the needs for alignment, inversion, rearrangement, and base pallets, thereby improving productivity. In addition, no shearing is used to remove the completed motor from the skeleton 21. Thus, no impact associated with shearing occurs, thereby preventing the quality of the motor from being degraded. In addition, this motor has excellent characteristics that it is not limited in outer-diametral shape and that it is suitable for size reduction because its external shape can be formed with a mold accuracy.

In addition, since the motor of this embodiment uses the motor base connector 20, the skeleton 21 holds the bases 2 to eliminate the needs for extra materials such as bridges. Consequently, the base costs can be reduced. In addition, due to the lack of the need to cut bridges, no space is required for a cutting edge, thereby preventing distortion caused by stress resulting from cutting. As a result, the base can be fully used to arrange parts. Alternatively, the required area can be minimized to reduce the size and weight of the motor. Due to the lack of constraints on connections such as the use of bridges, the base can be shaped arbitrarily. In addition, since the external shape can be formed with the mold accuracy, this motor can be produced accurately and is suitable for size reduction.

In addition, the base 2 of the motor of this embodiment comprises a double-side printed circuit board. The plurality of lands are located on each of the bottom surface and the stator side so that the mutually corresponding lands are connected via the through-holes. Accordingly, no other electric connection members are required, thereby enabling the stator to be compactly connected to an external connection terminal and reducing the size and weight of the motor. Furthermore, the double-side printed circuit board is suitable for the present method because its solder heat resistance and a mechanical strength are high, because its outer circumferential side can be held, and because it is subjected to little warpage due to its symmetry in the thickness direction. Thus, this invention can provide motors of a high quality and productivity.

In this manner, the motor of the present invention does not use the substrate as a simple electric wiring member but as a principal structure (base) for the motor to reduce the number of parts required and the weight. Furthermore, the base comprises a plate-like substrate using an electric insulating material as a base material. The use of the electric insulating material enables the use of a structure comprising motor components on one surface of the substrate and external connection terminals on the other surface, thereby enabling required functions to be arranged compactly. The strength of this substrate lower than that of a metal substrate is compensated for by reducing the weights and sizes of all parts.

In addition, since the motor is structured to expose the outer circumferential side of the base, it can be continuously held in the connector until it is completed. Furthermore, the substrate is held using the pushback method, which is most suitable for reducing the size of the substrate while increasing the accuracy. According to the present structure, the motor is assembled by using the connected substrate intended for the above usage and simply and sequentially placing parts on one surface of the substrate. Furthermore, the fixation and junction of all parts is completed by simply reflow-heating the assembly. In this manner, the flat brushless motor having a reduced size and weight and an improved productivity has been completed.

As is apparent from the above description, the flat brushless motor is suitable for the SMT method and is preferred for the reflow soldering method for the following reasons:

(a) The terminals are structured so as to be solder-connected to the substrate of the equipment by placing and heating the motor on the substrate.

(b) The internal motor structure is not destroyed by infrared heating and hot blast heating.

(c) The motor quality is not degraded by a solder or the flux atmosphere. In addition, the motor can be efficiently mounted on the substrate of the equipment for the following reasons:

(d) It has an easy-to-handle shape.

(e) It can be transferred using a chuck.

(f) Its direction can be determined when the motor is mounted.

(g) The packaging form is suitable for automatic supply. In addition, the motor can be mounted on the substrate of the equipment so as to achieve a high density for the following reasons:

(h) It serves to reduce an area of the substrate of the equipment that is occupied by itself.

(i) It serves to reduce the interval between itself and the adjacent electronic part. Furthermore, the motor can be provided with a high impact resistance for the following reasons:

(j) It can be coupled firmly to the substrate of the equipment.

(k) An impact force can be evenly supported by each terminal.

(l) The internal structure can be simplified.

(m) The weight of the rotor can be reduced.

(n) The height of the motor can be reduced.

In addition, the present invention uses the skeleton to hold the motor base for assembly, thereby eliminating the needs for an extra space for shearing as in the bridge method to enable the size and weight to be reduced. In addition, no impact that is associated with shearing and separation of completed products occurs, so a high quality can be maintained.

In addition, since the base of this motor comprises an insulating plate, the motor is light, small, and compact. It also has an improved productivity because it can be held and assembled as described above.

As a result, portable information equipment comprising the flat brushless motor according to the present invention has a reduced size and weight, an improved productivity, and increased added values, compared to the prior art.

What is claimed is:

1. A brushless motor comprising:

a housing comprising a bottom surface, a side surface, and a top surface, said bottom surface being located adjacent and opposite to a substrate of an equipment; and pairs of terminals on the outer side of said bottom surface that can be mechanically or electrically joined with said substrate of the equipment, each of said pairs of terminals being arranged on both sides with respect to a line passing through the centroid or center of gravity of the bottom surface, wherein there are provided a stator, a bearing device, and a rotor inside said housing, said stator having a stator core and a coil wound around the stator core, said rotor having a magnet and being supported by said bearing device so as to rotatably surround the periphery of said stator, said rotor further including unbalance means.

2. The brushless motor according to claim 1, wherein the number of pairs of terminals on the bottom surface is larger than the number of poles required for electric connections.

3. The flat brushless motor according to claim 1, wherein the top and side surfaces of the housing substantially surround the overall circumference of the rotor.

4. A portable information equipment comprising said brushless motor according to claim 1.

5. A portable information equipment comprising the brushless motor and the substrate for mounting the brushless motor thereon according to claim 1, said motor being surface-mounted on said substrate.

6. A portable information equipment comprising the brushless motor and the substrate for mounting the brushless motor thereon according to claim 1, wherein a number of lands adapted for fixation of the motor of the equipment is larger than a number of poles needed for electrical connection of said brushless motor.

7. A portable information equipment comprising the brushless motor and the substrate for mounting the brushless motor thereon according to claim 1, wherein a cover of said brushless motor is electrically grounded to said substrate of the equipment.

8. A brushless motor comprising:

a housing comprising a bottom surface, a side surface, and a top surface, said bottom surface being located adjacent and opposite to a substrate of an equipment; and pairs of terminals that protrude outward from said side surface approximately at the same height as the bottom surface and that can be mechanically or electrically joined with said substrate of the equipment, each of said pairs of terminals being arranged on both sides with respect to a line passing through the centroid or center of gravity of the bottom surface, wherein there are provided a stator, a bearing device, and a rotor inside said housing, said stator having a stator core and a coil wound around the stator core, said rotor having a magnet and being supported by said bearing device so as to rotatably surround the periphery of said stator, said rotor further including unbalance means.

9. A brushless motor comprising:

a housing comprising a bottom surface, a side surface, and a top surface, said housing including a chuck section, the outer side of said bottom surface being located adjacent and opposite to a substrate of an equipment; and pairs of terminals on the outer side of said bottom surface or said side surface that can be mechanically or electrically joined with said substrate of the equipment, each of said pairs of terminals being arranged on both sides with respect to a line passing through the centroid or center of gravity of the bottom surface, wherein there are provided a stator, a bearing device, and a rotor inside said housing, said stator having a stator core and a coil wound around the stator core, said rotor having a magnet and being supported by said bearing device so as to rotatably surround the periphery of said stator, said rotor further including unbalance means.

10. The brushless motor according to claim 9, wherein the chuck section comprises a sucked surface that is located on the top surface and to which a suction chuck can be opposed.

11. The brushless motor according to claim 9, wherein the chuck section comprises two parallel planes located on the side surface and extending approximately perpendicularly to the bottom surface or two parallel ridges located on the side and extending parallel with the bottom surface.

12. The brushless motor according to claim 9, wherein the chuck section comprises a ferromagnetic member forming the top surface.

13. The brushless motor according to claim 9, further having on the top or side surface, a marking for enabling the mounting direction of the motor to be determined.

14. An assembly method for a portable information equipment comprising the brushless motor and the substrate for mounting the brushless motor thereon according to claim 9, comprising providing a brushless motor in each of a plurality of embosses arranged in series to form a tape-like package, and surface-mounting said provided brushless motor on said substrate of the equipment.

* * * * *